J. J. WHITE.
Lightning-Rods.
No. 143,862. Patented Oct. 21, 1873.
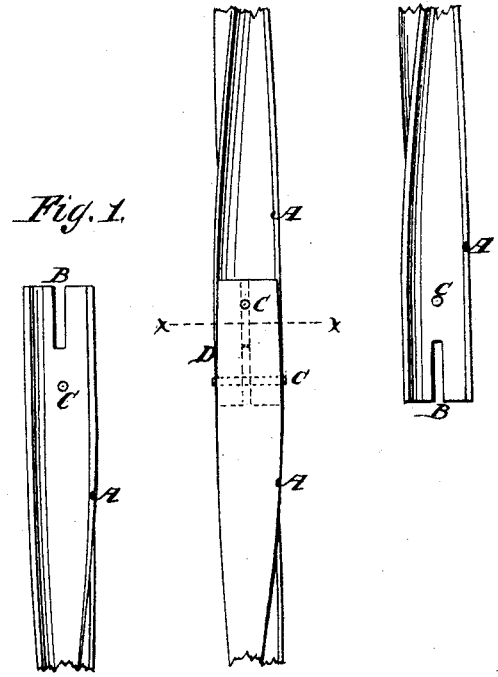
Fig. 4.
Witnesses:
E. Wolff
Sedgwick
Inventor:
J. J. White
Per Munn & Co.
Attorneys.

UNITED STATES PATENT OFFICE.

JOSEPH J. WHITE, OF JULIUSTOWN, NEW JERSEY.

IMPROVEMENT IN LIGHTNING-RODS.

Specification forming part of Letters Patent No. 143,862, dated October 21, 1873; application filed May 31, 1873.

*To all whom it may concern:*

Be it known that I, JOSEPH J. WHITE, of Juliustown, in the county of Burlington and State of New Jersey, have invented a new and useful Improvement in Lightning-Rods, of which the following is a specification:

The object of this invention is to improve lightning-rods by rendering them more durable and easier made and more permanently joined together than they have hitherto been; and it consists in the joint, and in such a construction of the rod that the pieces slip together, and the ends lap past each other and form the joint, as hereinafter described.

In the accompanying drawing, Figure 1 is a side view of the rod, showing the end slotted. Fig. 2 shows two parts of the rod joined together according to my invention. Fig. 3, like Fig. 1, shows the end of the rod slotted, the two parts (Figs. 1 and 3) being ready to be joined, as seen in Fig. 2. In Fig. 2 the slots and rivets are seen in dotted lines. Fig. 4 is a cross-section taken on the line $x\ x$ of Fig. 2.

Similar letters of reference indicate corresponding parts.

In cross-section, this rod is made with an angular or circular groove on opposite sides; or it may be shaped like an H. In this example of my invention the two opposite sides are hollowed out or grooved on a circle, as seen in the cross-section.

A is the rod. B represents the slot which is cut in the ends to be joined, as seen in Figs. 1 and 3. The two pieces are slipped together and riveted at the points C C, forming the joint D. (Seen in Figs. 2 and 4.) The rod may be twisted or not; the joint is the same in either case.

A rod joined in this manner is not increased in size at the joint. Its outer angles remain the same, but the strength and solidity of the rod are greatly increased at the joint. The rivets are placed at right angles with each other, and hold the parts firmly together.

By making the rod in this or in a similar form and joining the ends, as described, it presents a neat and finished appearance when attached to a building, and is far superior to anything of the kind in use.

In an end-slotted rod of the "star" shape there is no chance to apply rivets.

It is the peculiar shape of my rod, in connection with the ends passing each other, that admits of two rivets passing through the joint at right angles to each other, thus securely binding the parts together, and making the joint the strongest part of the rod. High winds would widen the slots in a star-shaped rod, separate the parts of the joint, and thus render the rod a very imperfect and unreliable conductor. With my plan no such result is possible.

In putting up rods the operator always commences at the top of the building and works downward, so that, upon reaching the bottom, he has simply to cut off the superfluous length with a cold-chisel, and the rod is complete.

It would be necessary to commence putting up a star-shaped rod at the bottom, which would almost always necessitate the cutting off a superfluous piece at the top, and the making of a new joint to receive the gilded point while on top of the building. This would be a very difficult and expensive operation. My rod avoids this objection.

A given quantity of metal in the shape of my rod is stiffer and stronger than in the star shape, and this is because the heft of my metal is distributed at the circumference, instead of at the center.

The star rod is the most popular rod now in the market, but is generally jointed with a copper coupling, into which the ends are screwed. The advantage of this rod is its large extent of conducting-surface; but, in actual use, almost invariably, the conducting power of the rod is diminished largely by the shoulder of sections not being in contact with the coupling. This gap is caused by the winds swaying the rod to and fro. With my rod no such result is possible. The joint is not only the strongest part of the rod, but it has more conducting power than any other part, both as regards area in contact and surface in contact; and yet it possesses all the advantage of the star-rod, viz., large extent of surface.

With all its other advantages, my rod can be made cheaper, and consequently sold cheaper, than any other rod having the same conducting capacity.

Having thus described my invention, I claim as new and desire to secure by Letters Patent—

A lightning-rod composed of sections grooved on two opposite sides, split at each end in a plane bisecting the grooves, and having full faces on the other sides, as described, so that they will form a rectangular joint, in the manner described.

JOSEPH J. WHITE.

Witnesses:
B. B. ANTRIM,
JOS. L. LAMB.